Patented May 26, 1953

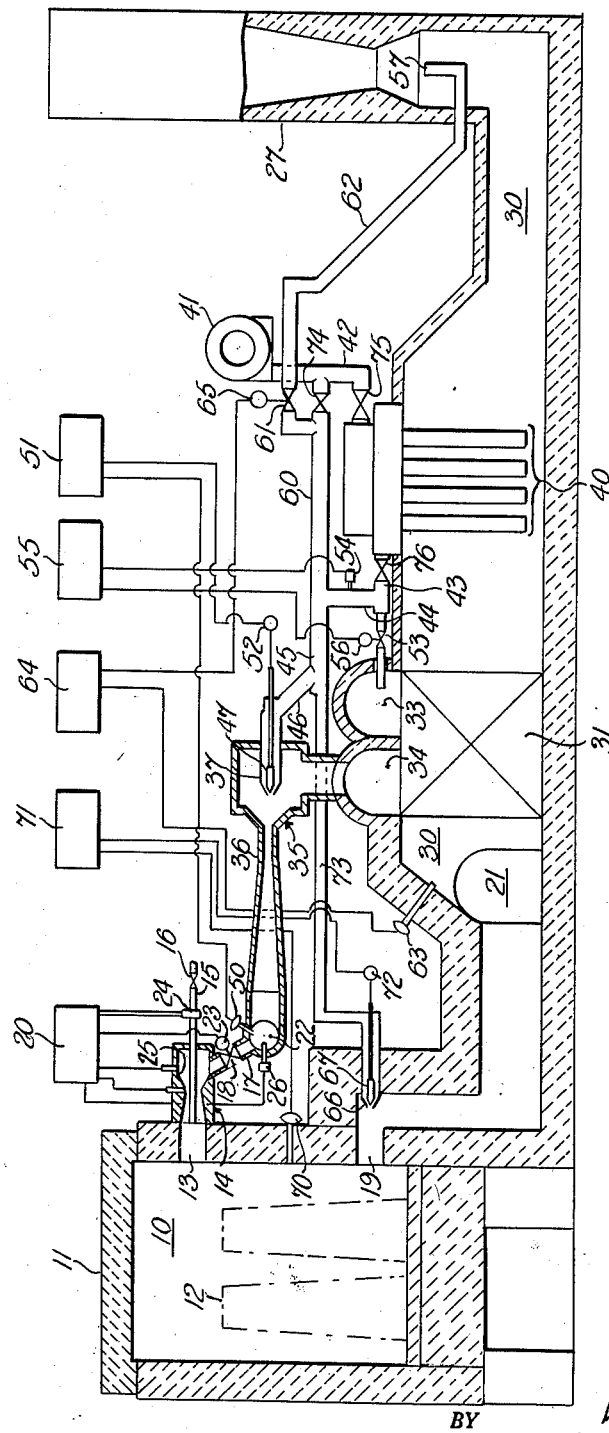

2,639,910

UNITED STATES PATENT OFFICE 2,639,910

COMBUSTION APPARATUS USING PREHEATED AIR

Carroll Cone, near Toledo, Ohio, and William H. Dailey, Jr., near Library, Pa., assignors to Surface Combustion Corporation, Toledo, Ohio, a corporation of Ohio Application November 30, 1949, Serial No. 130,294

4 Claims. (Cl. 263—15)

1

This invention relates to combustion apparatus for high temperature heating furnaces such as soaking pits and the like. In high temperature furnace operation, it is common practice to preheat the air for support of combustion by means of a recuperator heated by a stream of flue gas vented from the furnace. A refractory tile recuperator is well adapted to withstand the high temperatures of the flue gas vented from the furnace but is not well adapted to withstand substantial differential pressure between the air and the flue gas streams flowing through the recuperator and, therefore, it has been proposed to employ a hot fan for drawing the air rather than forcing it through the air passages of the recuperator and for forcing the heated air to the furnace burner. However, because of bearing problems and temperature limitations of the materials of which the fan is constructed, the safe operating temperature of the fan is usually substantially below the attainable preheat temperature of the air, hence in such cases the preheat temperature must be limited to the safe operating temperature of the fan. The general object of the present invention is to make it practical to employ a jet pump instead of a fan for drawing the air through the recuperator and for forcing it to the furnace burner whereby to permit full use of the attainable preheat temperature of the air and to avoid the numerous operating difficulties inherent in the use of a hot fan. For a consideration of what we consider to be novel and our invention, attention is directed to the following specification and the concluding claims thereof.

In the accompanying drawings forming part of this specification, the single figure is a more or less diagrammatic view of a soaking pit with the present invention applied thereto.

The soaking pit comprises combined combustion and heating chamber 10 or furnace chamber which is normally closed by a cover 11, the chamber normally being of a size to contain a plurality of steel ingots 12 indicated in outline by discontinuous lines. Heating flame enters the chamber 10 from a firing port 13 whose inlet is coincident with the outlet of a burner 14 to which fuel is delivered by a supply pipe 15 having a control valve 16 and to which air for combustion is delivered by a duct 17 having a control valve 18. Flue gas (products of combustion) is vented from the chamber 10 through an exhaust port 19. The heating unit thus far described represents nothing new and is usually one of several units having a common flue gas exhaust manifold 21 and a common burner air distributing manifold 22.

The predetermined ratio of air to fuel delivered to the burner 14 may be maintained substantially constant during the varying rates of fuel supply (as necessitated by furnace operation) by any preferred ratio control means which, for illustrative purposes, has been shown as comprising an air valve operating instrument 20 which in order to maintain volumetric proportions of the air and fuel is made responsive (1) to changes in differential pressure in the fuel stream at an ordinary metering orifice 24 and (2) to changes in differential pressure in the air stream at a Venturi type metering orifice 25 shown as embodied in the burner 14 itself, the instrument actuating the air valve 18 through a motor means 23 controlled by said instrument. In order to maintain the weight ratio of air to fuel substantially constant during changes in temperature of the air delivered to the burner, the instrument 20 may also be made responsive to such changes in temperature of said air as made manifest by a thermocouple 26 in the air distributing manifold 22.

The flue gas exhaust manifold 21 connects with a stack 27 through a connecting flue 30 and there is positioned in said flue next adjacent said exhaust manifold a refractory tile recuperator 31 which may be considered as being of the type disclosed in patent to Stein 1,404,721. A refractory tile recuperator is preferred over a metal recuperator because a tile recuperator is better adapted than a metal recuperator to withstand the relatively high temperature of the flue gas coming from said exhaust manifold. The cold air inlet for the air ducts of said recuperator is indicated at 33 and the hot air outlet at 34.

A hot air duct generally indicated at 35 connects the recuperator hot air outlet 34 with the hot air distributing manifold 22 for the burners 14 and the means for causing the heated air to flow from said outlet 34 to said manifold 22 comprises a jet pump in said duct, the pump comprising an entraining tube 36 and a nozzle 37 for discharging motive fluid into the mouth of said tube across an intervening air space whereby to draw heated air from said outlet and thence force it to said air distributing manifold 22. The resulting partial vacuum at said outlet 34 is sufficient to cause air at atmospheric pressure to enter and flow through the air passages of the recuperator from the air inlet 33 of the same.

The motive fluid for the jet pump is air under pressure that has been preheated by being passed through the air passages of a metal recuperator 40 positioned in the flue 30 at a point between the stack 27 and the tile recuperator 31 whereby the flue gas which heats the metal recuperator is flue gas which has already passed through the tile recuperator and which therefore is cool enough to make it practical to employ a metal recuperator at that point. The metal recuperator may be considered as being of the type disclosed in patent to Mantle 2,332,450. The motive air is delivered under pressure to the air intake side of the metal recuperator 40 by a motor driven blower 41, the delivery conduit from the blower being indicated at 42. The delivery conduit from the metal recuperator to the jet pump nozzle 37 comprises the conduit sections 43, 44, 45 and 46.

The jet pump nozzle 37 is of the variable orifice type by virtue of a needle valve 47 therein. The position of the needle valve 47 may be automatically controlled by means responsive to changes in pressure of the air in the burner air distributing manifold 22 to maintain said pressure substantially constant and said means may comprise an element 50 directly responsive to said changes, an instrument 51 actuated by said element and a motor means 52 adapted to be actuated by said instrument for moving said valve.

To guard against overheating of the metal recuperator 40, a stream of the already heated air may be spilled from the hot air delivery conduit to permit a greater volume of relatively cold air from the blower 41 to flow through said recuperator. A spill valve for that purpose is indicated at 53 in a branch line which delivers to the cold air inlet 33 of the tile recuperator so that the preheat of the vented air need not be wasted. The spill valve may be controlled by means responsive to changes in temperature of the air in said conduit in a manner to maintain said temperature substantially constant, and the means for that purpose may comprise an element 54 directly responsive to such temperature changes as in the conduit section 44, an instrument 55 actuated by said element and a motor means 56 actuated by said instrument for moving said valve.

The stack 27 may be of the ejector type comprising a nozzle 57 for the discharge of motive fluid for drawing flue gas from the flue 30. The motive fluid may be heated air coming from the metal recuperator 40, the delivery conduit in such case comprising the conduit sections 43 and 44, branch line 60, valve 61 and line 62. The draft produced in the stack by the ejector motive fluid may be controlled by means responsive to changes in pressure in the flue gas exhaust manifold 21 and the means for that purpose may comprise an element 63 directly responsive to such changes, an instrument 64 actuated by said element, and motor means 65 actuated by said instrument to move said valve, the arrangement being such as to maintain the pressure in said exhaust manifold 21 substantially constant.

It is desirable in soaking pit operation to maintain the pressure of the furnace atmosphere in the heating chamber 10 substantially constant and the means for that purpose may comprise a variable orifice jet damper nozzle 66 positioned to discharge a stream of gaseous medium under pressure counter-current to the outgoing stream of flue gas, the rate of discharge of said medium from said nozzle being controlled by a needle valve 67 which is actuated by means responsive to changes in pressure in said chamber. The means for that purpose may comprise an element 70 directly responsive to said changes, and an instrument 71 actuated by said element and a motor means 72 actuated by said instrument to move said valve. The gaseous medium delivered to said nozzle 66 may be heated air under pressure delivered to said nozzle by a conduit 73 which communicates with the air discharge side of the metal recuperator through conduit sections 45, 44 and 43.

The air from the blower 41 can be by-passed around the metal recuperator 40 during needed repairs to the latter by opening an outlet valve 74 between the blower discharge conduit 42 and the branch pipe 60, the recuperator being isolated by the closing of valves 75 and 76 at the air inlet and outlet sides of the recuperator.

Without intending to limit the application of the invention, it may be stated that depending on operating conditions the pressure of the air delivered by the blower 41 to the metal recuperator 40 may be about two pounds gauge pressure; that the exit temperature of the air from the metal recuperator will ordinarily be about 500–600 deg. F., and that the air heating capacity of the tile recuperator 31 will ordinarily be such that the mean temperature of the air at the burner air distributing manifold 22 will be about 900–950 deg. F.

The air pressure that must be maintained at the burner air distributing manifold 22 depends primarily on the design of the burners 14 but should desirably be as low as possible since the lower the back pressure the better is the operating efficiency of the jet pump 36—37 and it will be understood that the Venturi metering orifice or passage 25 in the burner itself is an important factor in permitting the use of relatively low pressure between the burner and pump. Where a single jet pump is used to supply several heating units with combustion air it is of course desirable that the air in the air distributing manifold 22 be maintained substantially constant. On the other hand where each heating unit has its own jet pump it will be understood that it is not necessary to maintain said back pressure constant and therefore that the jet pump need not be controlled by means responsive to the back pressure but may be controlled in such a manner that the air delivery of the pump is proportional to the demand of air by the heating unit.

It will be understood that the recuperator 40 is made of metal primarily in order that air under pressure may be heated therein without leakage. However, a metal recuperator also has rapid heat transfer characteristics and is therefore particularly well adapted for use downstream from the tile recuperator 31 which of course has heat storage characteristics. Although the preferred location of the metal recuperator 40 is downstream in the flue 30 with respect to the tile recuperator 31 there may be cases where it may be otherwise located and therefore no limitations on its locations are intended except as expressed in the concluding claims hereof.

Certain features herein disclosed but not claimed are claimed in application Serial No. 130,305 filed concurrently herewith by W. M. Hepburn and owned by the same assignee as the present application. This application has now matured into Patent No. 2,627,398.

What is claimed as new is.

1. In combustion apparatus for supplying combustion air to a plurality of individually controlled burners arranged to fire into furnace chambers, in combination, means forming a flue gas passage for venting flue gas from the furnace chambers; a recuperator disposed in the flue gas passage and having an air heating duct therethrough; air supply pipes for supplying air to each of the burners; air valves in the air supply pipes for individually controlling the supply of air to each burner; an air manifold for supplying air to the air supply pipes; an air conduit for conducting air from the air heating duct of the recuperator to the manifold; a jet pump in the air conduit for drawing air from the recuperator air heating duct and delivering it to the manifold; a nozzle forming part of the jet pump for discharging motive fluid into the air conduit; means for supplying motive fluid to the nozzle; a valve in the nozzle for controlling discharge of motive fluid therefrom; and control means responsive to pressure in the manifold and connected to the valve in the nozzle for actuating said valve in a manner tending to maintain the pressure in the manifold substantially constant.

2. In combustion apparatus for supplying combustion air to a plurality of individually controlled furnace chambers, in combination, means forming a flue gas passage for venting flue gas from the furnace chambers; a recuperator disposed in the flue gas passage and having an air heating duct therethrough; air supply pipes for supplying air to each of the combustion chambers; air valves in the air supply pipes for individually controlling the supply of air to each chamber; an air manifold for supplying to the air supply pipes; an air conduit for conducting air from the air heating duct of the recuperator to the manifold; a jet pump in the air conduit for drawing air from the recuperator air heating duct and delivering it to the manifold; a nozzle forming part of the jet pump for discharging motive fluid into the air conduit; means for supplying motive fluid to the nozzle; a valve in the nozzle for controlling discharge of motive fluid therefrom; and control means responsive to pressure in the manifold and connected to the valve in the nozzle for actuating said valve in a manner tending to maintain the pressure in the manifold substantially constant.

3. In combustion apparatus for a furnace having a heating chamber, in combination, a burner arranged to fire into the chamber, an air heating recuperator having a hot air outlet, a flue for venting flue gas from the chamber through the recuperator, a conduit forming an air passage connecting the hot air outlet of the recuperator with the burner, a jet pump in the conduit for drawing air through the recuperator and for forcing at least a portion of the air to the burner, a second recuperator, conduit means for passing flue gas from said flue through the second recuperator, blower means for supplying air under pressure to the second recuperator and thence to the jet pump, a jet damper nozzle arranged in the flue to discharge a stream of air into the flue gas counter-current thereto, and conduit means for supplying heated air under pressure from the second recuperator to the jet damper nozzle.

4. In apparatus according to claim 3, in combination, means responsive to pressure of the atmosphere in the heating chamber for controlling flow of heated air from the jet damper nozzle in a manner tending to maintain the pressure of that atmosphere substantially constant.

CARROLL CONE.
WILLIAM H. DAILEY, Jr.

References Cited in the file of this patent

UNITED STATES PATENTS

| Number | Name | Date |
|---|---|---|
| 1,635,939 | Isley | July 12, 1927 |
| 1,792,021 | Loftus | Feb. 10, 1931 |
| 1,810,776 | McDermott | June 16, 1931 |
| 1,867,221 | Hepburn | July 12, 1932 |
| 1,896,910 | Merkt | Feb. 7, 1933 |
| 1,915,470 | Mawhinney | June 27, 1933 |
| 2,025,165 | Henry | Dec. 24, 1935 |
| 2,029,580 | Merkt | Feb. 4, 1936 |
| 2,158,095 | Vierow | May 16, 1939 |
| 2,171,353 | Brassert | Aug. 29, 1939 |
| 2,217,518 | Merkt | Oct. 8, 1940 |
| 2,261,904 | McDermott | Nov. 4, 1941 |
| 2,414,888 | Morton et al. | Jan. 28, 1947 |
| 2,627,398 | Hepburn | Feb. 3, 1953 |